United States Patent
Escalante

(10) Patent No.: US 7,240,911 B1
(45) Date of Patent: Jul. 10, 2007

(54) SYSTEM FOR CONTROLLING DISTRIBUTION OF FLUID TO A SYSTEM OF AIR BAGS FOR USE WITH VEHICULAR TRAILERS

(75) Inventor: Frank Escalante, Broken Arrow, OK (US)

(73) Assignee: Escalante Enterprises, L.L.C., Tulsa, OK (US)

( * ) Notice: Subject to any disclaimer, the term of this patent is extended or adjusted under 35 U.S.C. 154(b) by 469 days.

(21) Appl. No.: 10/849,199

(22) Filed: May 19, 2004

(51) Int. Cl.
*B60G 11/27* (2006.01)

(52) U.S. Cl. .................. 280/124.16; 280/124.157
(58) Field of Classification Search ......... 280/124.157, 280/124.158, 124.159, 124.16; 137/883
See application file for complete search history.

(56) References Cited

U.S. PATENT DOCUMENTS

| | | | |
|---|---|---|---|
| 2,691,420 A | 10/1954 | Fox et al. .................. 180/22 |
| 3,246,905 A | 4/1966 | Morgan ..................... 280/6 |
| 3,302,980 A | 2/1967 | Bystricky et al. ............ 303/5 |
| 3,433,493 A | 3/1969 | Hirst ......................... 280/6 |
| 3,655,214 A * | 4/1972 | Lane et al. ............. 280/43.23 |
| 4,054,327 A | 10/1977 | Rebenstorf ................ 303/84 R |
| 4,070,644 A | 1/1978 | Shellhause ................ 340/52 C |
| 4,252,379 A | 2/1981 | Falk ......................... 303/6 C |
| 4,721,133 A * | 1/1988 | Sundblom ................... 137/883 |
| 5,005,858 A | 4/1991 | Torielli et al. ............. 280/707 |
| 5,640,990 A | 6/1997 | Rodriguez ............... 137/68.14 |
| 5,855,379 A | 1/1999 | Buma et al. ............ 280/5.514 |
| 6,332,623 B1 * | 12/2001 | Behmenburg et al. . 280/124.16 |
| 6,354,617 B1 | 3/2002 | Behmenburg et al. ... 280/124.157 |
| 6,523,845 B2 | 2/2003 | Stiller .................... 280/124.16 |
| 7,066,474 B2 * | 6/2006 | Hiebert et al. ........... 280/6.153 |
| 2001/0015538 A1 * | 8/2001 | Schoop ................ 280/124.157 |
| 2002/0171219 A1 * | 11/2002 | Sorum et al. .......... 280/124.16 |

* cited by examiner

*Primary Examiner*—Ruth Ilan
(74) *Attorney, Agent, or Firm*—Head, Johnson & Kachigian

(57) ABSTRACT

A valve system controls which air bags on a tractor trailer are in fluid communication with a pressurized air supply source. If one of the air bags develops a leak, an air bag may be taken out of fluid communication with the remaining air bags and pressurized air source. A pressure gauge monitors the air pressure within the valve system and air bags. A dump valve allows the air pressure within the system to be decreased.

6 Claims, 3 Drawing Sheets

SYSTEM FOR CONTROLLING DISTRIBUTION OF FLUID TO A SYSTEM OF AIR BAGS FOR USE WITH VEHICULAR TRAILERS

BACKGROUND OF THE INVENTION

1. Field of the Invention

The present invention relates to a system of valves for regulating and controlling the amount of a pressurized fluid within a system of air bags used as a suspension system for a trailer. Specifically, the system consists of a series of valves for fluidly connecting and disconnecting suspension air bags from a pressurized air source.

2. Prior Art

In the trucking industry, trailers are typically fitted with air bags above their axles. These air bags support the cargo portion of the trailer. They are typically supplied with pressurized air from the same source that supplies air to the air brakes. If one of the air bags breaks or forms a leak, the air supply is depleted. This results in all four air bags losing air. It also results in loss of air pressure to the air brakes, causing them to lock up and forcing the truck to stop. When this occurs on the open road, a repair vehicle must be sent out to the truck to repair the damaged air bag. This is both very expensive and very time consuming.

The prior art discloses a number of various air bags and similar devices and methods for controlling fluid inflow and outflow therefrom.

U.S. Pat. No. 2,691,420 issued to Fox on Jul. 2, 1949 discloses an arrangement especially designed to render more practicable the application to and installation in a large bus or motor coach of constant level pneumatic springs. Provision is made for increasing or decreasing the pressure of each supporting air column.

U.S. Pat. No. 3,246,905 issued to Morgan on Apr. 19, 1966 discloses an apparatus and method for supporting variable static loads by a fluid pressure spring-shock absorber including thermoelectrically controlled vapor pressure varying means and lock-out control means.

U.S. Pat. No. 3,302,980 issued by Bystricky Feb. 7, 1967 discloses a valve means for use in apparatus having a plurality of pressurized fluid operated devices, and is more particularly directed to a quick-opening, quick-closing valve which is operable automatically under the influence of fluid pressure to open and to close a port in response to predetermined pressure variations, which automatic operation may be manually overridden to positively close the port, when desired.

U.S. Pat. No. 3,433,493 issued to Hist on Jan. 4, 1967 discloses a road vehicle suspension system having interconnected front and rear fluid springs which maintain a given vehicle body attitude regardless of differing dynamic deflections of the front and rear suspensions.

U.S. Pat. No. 4,054,327 issued to Rebenstorf on Oct. 18, 1977 discloses an air brake system for a vehicle with a plurality of air-operated brakes for retaining braking capacity in the event of line rupture or severe leakage at various points in the system. Brake control means, preferably of the form with two separately actuatable control valves each independently capable of actuating the brakes, has two check valve-protected air-receiving ports each coupled to a separate one of two reservoirs.

U.S. Pat. No. 4,070,644 issued to Shellhause on Jan. 24, 1978 discloses a dual circuit brake system having a failure warning section in which the pressures in each of the circuits are sensed by a pair of pistons having a switch actuating shuttle positioned between the pistons by a pair of springs. If the cause of pressure loss was a leak or rupture in a portion of the rear brake system beyond outlet 28, the closing of valve 50 will effectively prevent undue brake fluid loss through that portion of the system.

U.S. Pat. No. 4,252,379 issued to Falk on Feb. 24, 1981 discloses a pressure control valve for use in vehicle hydraulic diagonal split brake systems. The control valve further includes second valve means which will be disposed in the second fluid branch of the dual brake system to transit fluid pressure at the second inlet to the second outlet and to limit the fluid pressure transmitted to the second outlet relative to the fluid pressure at the second inlet when the fluid pressure at the second inlet is above the predetermined level.

U.S. Pat. No. 5,005,858 issued to Torrielli on Apr. 9, 1991 discloses a hydro pneumatic suspension system able to vary at will, and independently of each other, the rigidity of the sustaining and load-adaptation means of each vehicle wheel, consisting of a series of sensors for measuring the dynamic attitude of the vehicle connected to a central electronic control unit, and respective hydraulic dampers of adjustable internal pressure, which support the wheels and are connected to respective hydro pneumatic service accumulators the internal pressure of which is controlled by solenoid valves controlled by the central control unit; hydraulic energy can be supplied to the accumulators by, for example, the servo-steering system pump via a common main accumulator. As the valves 32 are independently controlled, non-symmetrical load variations on the wheels of the same axle can be compensated, irrespective of how these occur, and it is possible to vary the load transfer between the two axles so as to influence the behavior of the vehicle when taking a bend (under-steering, over-steering).

U.S. Pat. No. 5,640,990 issued to Rodriguez on Jun. 24, 1997 discloses a safety valve for precluding leakage of a fluid from a ruptured conduit and provides a flexible conduit failure safety valve which has many of the advantages of automatic valve structures that result in a flexible conduit failure safety valve.

U.S. Pat. No. 5,855,379 issued on Buma on Jan. 5, 1999 discloses a control system of an automotive vehicle including a vehicle height control apparatus for adjusting height of the vehicle under control of fluid under pressure supplied from a first fluid pump and a brake control apparatus for regulating braking forces applied to a set of road wheels of the vehicle under control of fluid under pressure supplied from a second fluid pump, wherein a single source of driving force in the form of an electric motor is adapted in common to the first and second control apparatuses to drive both the first and second fluid pumps.

U.S. Pat. No. 6,354,617 issued to Behmenburg on Mar. 12, 2002 discloses a level control arrangement having a pneumatically controllable directional valve which contains an over pressure function and a residual pressure holding function and which makes a rapid deflation or venting of the air springs possible.

U.S. Pat. No. 6,523,845 issued to Stiller on Feb. 25, 2003 discloses a method of filling a pressurized medium chamber of a level control system which includes a pressurized medium store and a compressor. The pressurized medium chamber is filled from the pressurized medium store over a time span during which the pressurized medium difference between the pressurized medium store and the pressurized medium chamber exceeds a threshold valve. When the pressurized medium difference between the pressurized medium store and the pressurized medium chamber reaches the threshold value, a further filling of the pressurized medium chamber is necessary and takes place by means of the compressor of the level control system.

None of the prior art patents disclose a system for use on tractor trailers that allows an operator to manually isolate any chosen individual air bag while inflating others. None of the prior art patents disclose an air bag regulating system for tractor trailers that allow the pressurized air source to power pneumatically driven tools and air to the tires. The prior art also does not disclose a system for allowing the air bags to be adjusted so that a trailer may continue moving in the event of a failure of a wheel bearing, tire blow out, broken axle, or similar malfunction.

It is therefore desirable to provide a system for regulating the air pressure with air bags on a trailer.

It is also desirable to provide a device that allows a trailer to continue traveling in the event of a failure of a wheel bearing, tire blowout, broken axle, or similar malfunction.

It is also desirable to provide a method for allowing a tractor pressure ride air source to power pneumatic tools and to inflate tires.

SUMMARY OF THE INVENTION

In the present invention a system of valves regulates which air bags are in fluid connection with the air supply source. The present invention has a valve system incorporated in line between the air supply source and the air bags. The valve system includes the pressurized air inlet that is fluidly connected to a series of valves, one for each air bag. The valves are fluidly connected to their respective air bags. When the valves are open, the air supply becomes fluidly connected to the air bags. By closing a valve, the valve's respective air bag is no longer supplied pressurized air by the pressurized air source.

Preferably the valve system also includes an additional valve associated with a pressurized air outlet. This outlet may be attached to pneumatic tools and may be used to operate on the trailer or tractor. The outlet may also be used to inflate the tires of the tractor or trailer. In addition, the pressure gauge may be incorporated into the valve system to monitor the pressure within the air bags that are in fluid connection with the pressurized air supply. Typically the valve system is designed for use with four air bags. However, the device may be designed to supply as few as one air bag or as many as are desired. The valve system may also have a plurality of outlets. The valve system may be made of any of a variety of materials as long as they are able to withstand up to 500 psi of air pressure.

It is therefore an object of the present invention to provide a means for continued operation of an air brake system and associated suspension air bags when one or more air bags develops a leak.

It is another object of the present invention to provide a device that allows a tractor trailer operator to utilize pneumatic tools, such as a pneumatic grease gun and to allow the operator to air low tires.

It is another object of the present invention to allow the operator of a tractor trailer to raise certain axles in the event of a tire blow out, a bearing problem, a damaged axle, a damaged wheel or other malfunction for to minimize wear on tires, bearings, axles and brakes.

It is another object of the present invention to provide a gauge to allow the operator to determine the weight of the load of a tractor trailer.

It is another object of the present invention to provide a means for allowing variation in the amount of air in selective air bags of a tractor trailer while loading and/or unloading, thereby providing for greater stability during the process.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

In the present invention, a system of valves is utilized to control the amount of air delivered by a compressed air source to individual suspension air bags. Preferably, the invention also includes a dump valve for releasing pressure from individual air bags. More preferably, the invention further includes a pressure gauge in which the internal pressure of the entire system or of each bag individually may be measured. By incorporating a pressure gauge into the system, the device allows a tractor trailer operator to determine the weight of his load to insure that the air bags are adequately inflated and that he or she is within the legal limits for truck weight on highways. Additional outlets may also be included to allow air pressure to be applied to the tires and to operate various pneumatic tools, such as grease guns.

Figure 1:
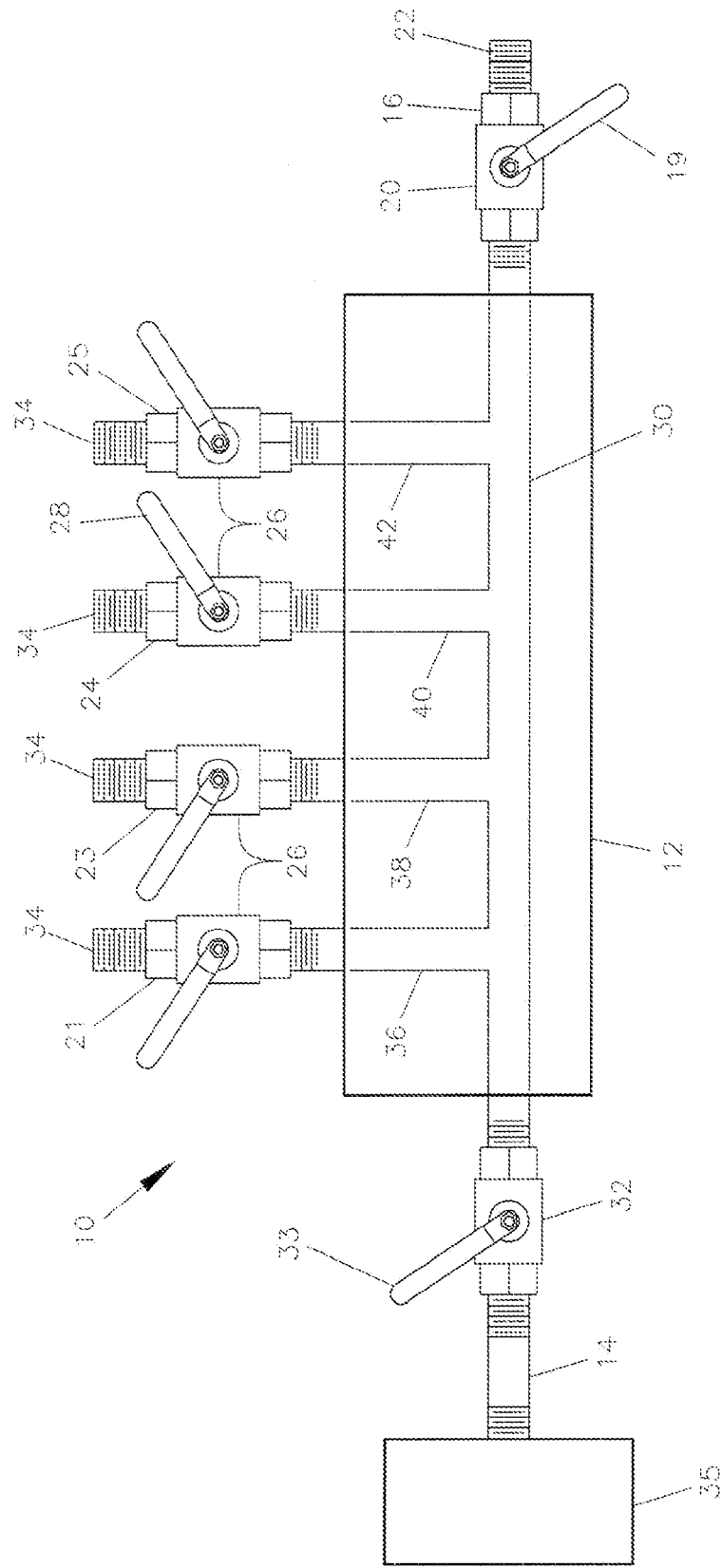
FIG. 1 is a schematic diagram of a preferred embodiment of the present invention.

FIG. 1 shows the preferred embodiment of the present invention. Valve system 10 consists of metal block 12 having an internal channel 30. Channel 30 is bored through metal block 12 using any of a variety of boring mechanisms known in the art of metal machining. Channel 30 has conduits 36, 38, 40 and 42 leading to regulators 21, 23, 24 and 25 respectively. Regulators 21, 23, 24 and 25 all have a valve 26, actuated by handle 28 and have attachment means 34. Channel 30 is also attached to dump valve 16. Dump valve 16 includes a valve 20 actuated by handle 19. Dump valve 16 also preferably includes attachment means 22 that allows valve 16 to be attached to a variety of tools including, but not limited to, an air pressure gauge, a tire inflating device, and a variety of pneumatically driven tools.

Attachment means 34 are adapted to be attached to any of a variety of types of tubing for conveying air pressure known in the art. By means of this tubing they are connected to a tractor trailer suspension system consisting of air bags.

Valve system 10 is fed pressurized air from pressurized air supply 34 through pressurized air inlet conduit 14. Inflow of pressurized air into the valve system 10 is regulated by means of inlet valve 22 actuated by handle 33.

Those skilled in the art will appreciate that valves 26, 20 and 32 may be any of a variety of valve types known in the art. Because it is desirable for valve system 10 be as compact as possible, valve types more suitable on a smaller scale, such as ball valves, are preferred. However, butterfly and other valve types are also suitable. The regulators 21, 23, 24 and 25 may be attached to conduits 36, 38, 40 and 42 respectively by use of threading, welding, brazing or any of a variety of other methods known in the art that are capable of forming an air tight seal capable of withstanding substantial air pressure.

During normal operation of a tractor trailer incorporating valve system 10, handle 33 is actuated so as to open valve 32 and allow compressed air from compressed air source 35 through compressed air conduit 14 and into the valve system 10. Handle 19 is actuated to close valve 20 of the dump valve 16. Handles 28 of the valves 26 are actuated so that valves 26 are open and allow for compressed air to travel from channel 30 through conduits 36, 38, 40 and 42 through regulators 21, 23, 24 and 25 respectively and into the air bags associated with each valve assembly. If one of the air bags associated with one of the valve assemblies creates a leak, the corresponding valve assembly is closed by actuating the handle 28 to close the valve 26 of that particular valve assembly. This prevents the compressed air source 35 as well as the remaining three air bags from losing pressure. By sealing off the damaged air bag by closing its respective valve assembly, the other air bags are allowed to continued to function normally. This allows the operator of a tractor trailer to continue traveling until he reaches a service station where a damaged air bag may be repaired and re-inflated. In the absence of incorporating the valve system 10 into a tractor trailer, all of the air bags remain in fluid connection with the air supply source. Therefore, when one of the air bags forms a leak, all of the air bags as well as the pressurized air supply become depressurized. All of the associated air bags will deflate and the trailer will become immobilized. Furthermore, if the same pressurized air supply is utilized to supply air to the tractor's air brakes, the loss of pressure will result in the air brakes locking up, thereby making the tractor immobile as well. The operator is then required to call in for assistance to have the tractor trailer repaired at a remote location. This is extremely inefficient as it wastes both time and money. When the present system is utilized, time and money are substantially saved because the operator may continue transporting the tractor trailer to the nearest service station. Those skilled in the art will appreciate that this a vast improvement over the existing technology.

The invention also includes a dump valve 16. This valve may be used to decrease the air pressure in one or more air bags. In order to reduce pressure in one or more air bags, handle 33 is actuated so as to close valve 32 so that the supply of pressurized air will not be reduced. Handles 18 of the air bag regulators are then actuated so that only the air bags in which air pressure is to be reduced remain in fluid connection with channel 30. Handle 19 is then actuated so as to open valve 20. This allows pressurized air to be released from the air bags connected to the regulators whose valves remain open. One or all of the associated air bags may be depleted in this fashion. If all of the air bags supporting a single axle are depleted it will tend to raise that axle. This may be done to save wear and tear on the tires, to relieve pressure on an axle having a blown out tire, a bearing problem, damage to the axle or other malfunctions. To facilitate raising of an axle, it is often desirable to add additional pressure to the air bags of another axle. This may be accomplished by closing the dump valve and closing the regulators corresponding to the deflated air bags. Inlet valve 32 and regulator valves corresponding to the axle that is not raised are then opened. This allows additional pressurized air to flow into the axle that is not being raised. This allows that axle to support the additional weight not supported by the raised axle.

Figure 2:
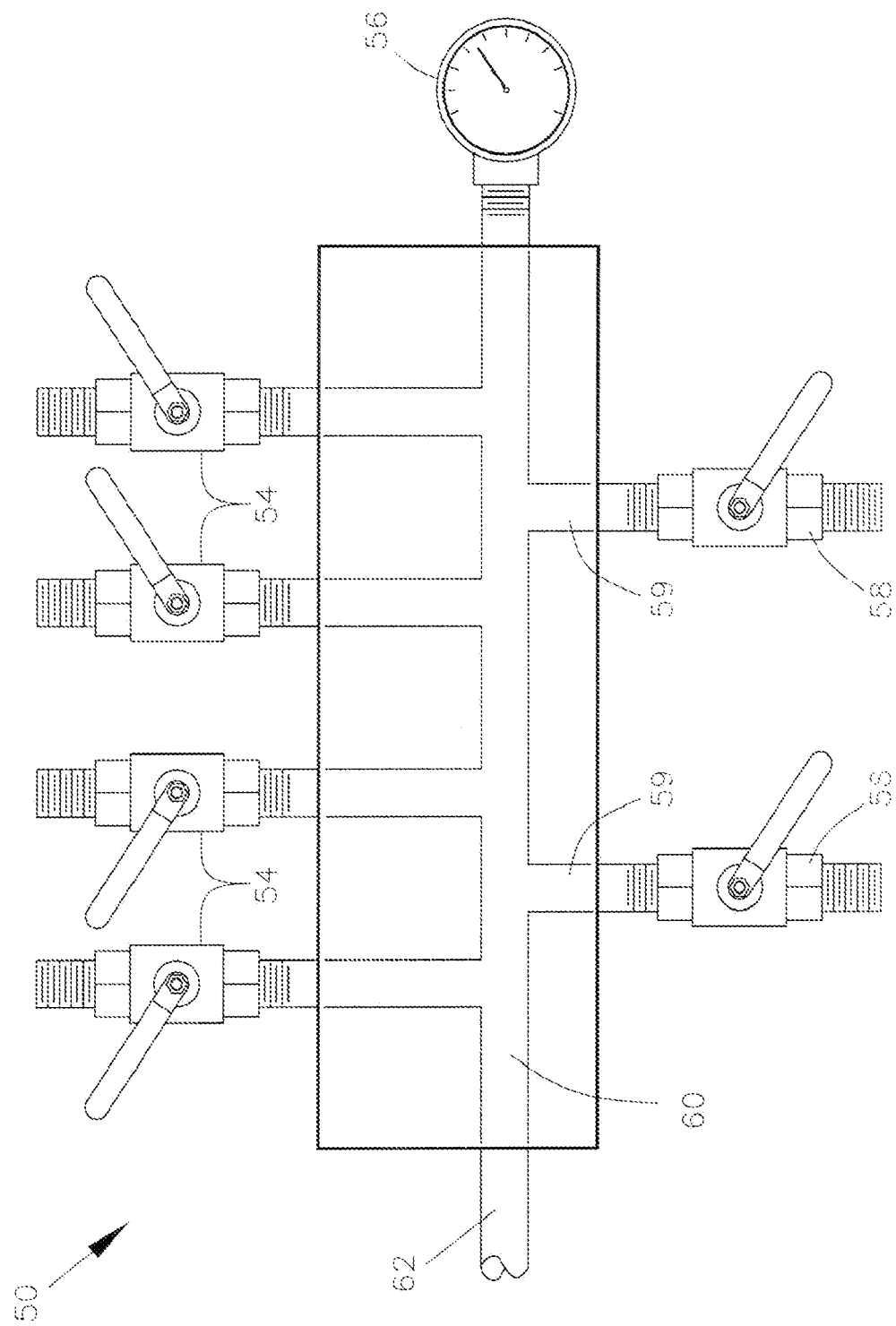
FIG. 2 is an alternative embodiment of the present invention.

FIG. 2 shows an alternative embodiment of the present invention. Valve system 50 is supplied with pressurized air through conduit 62 which is regulated by inlet valve (not shown). Pressurized air travels through channel 30 and to air bag regulators 54, pressure gauge 56 and outlet valves 58 connected to channel 30 by conduits 59. As with the embodiment shown in FIG. 1, the air bag regulators 54 control the supply of pressurized air to the air bags of a tractor trailer. Pressure gauge 56 may be utilized to measure the air pressure within the valve system and the air bags. This allows the operator to check that the air bags are sufficiently pressurized. In addition, those skilled in the art will appreciate that by measuring the air pressure of the air bags and valve system, the overall weight of the load being carried may be readily calculated.

Outlet valves 58 are similar to outlet 16 of FIG. 1. Outlet valves 58 extend in the opposite direction of air bag regulators 54. There are two outlet valves rather than one. Those skilled in the art will appreciate that additional outlet valves may readily be added to valve system 50 by boring additional conduits 59 into it. These may be used as dump valves or may be used to power pneumatically driven tools and add air to low tires.

The embodiment as shown in FIGS. 1 and 2 are designed for use with tractor trailers having four air bags. Those skilled in the art will appreciate that these designs may be easily modified to include more regulators that accommodate additional air bags for tractor trailer systems having additional axles, or fewer regulators to accommodate trailers having fewer axles.

Figure 3:
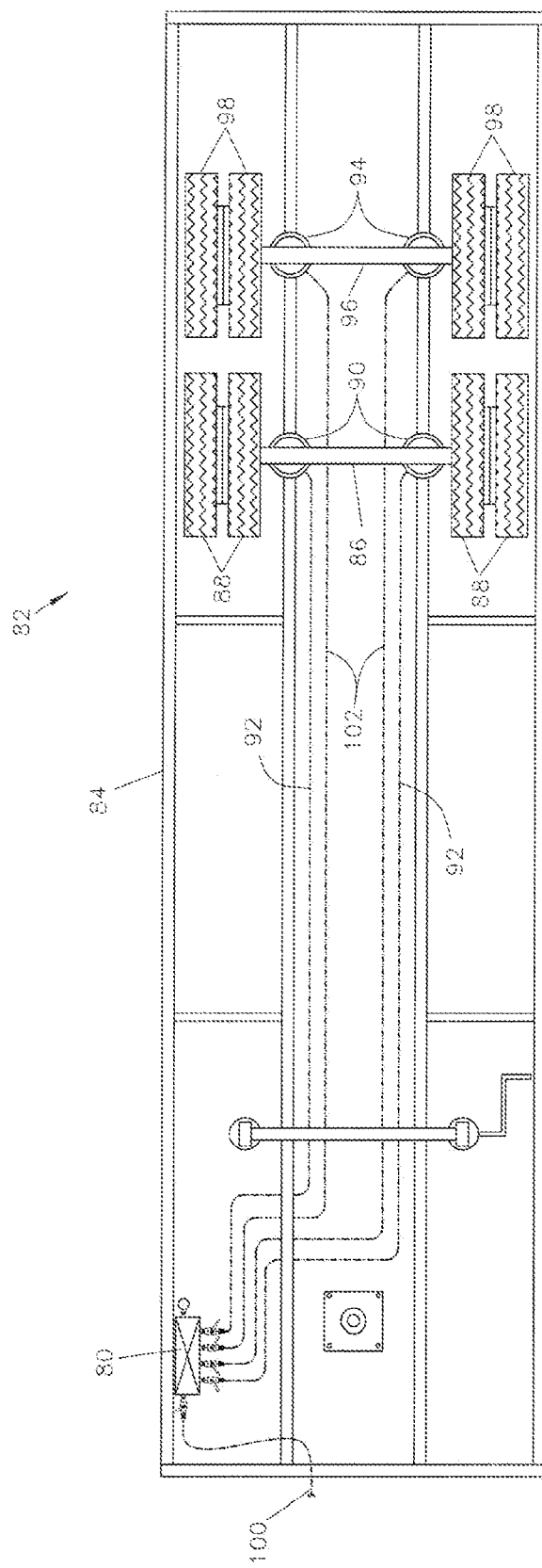
FIG. 3 is a bottom plan view of a trailer incorporating an embodiment of the present invention.

FIG. 3 shows the present invention in conjunction with a typical trailer. Trailer 82 has wheels 88 attached to axle 86 and wheels 98 attached to axle 96. Cargo bay 84 rests above axles 86 and 96 and are supported by air bags 90 on axle 86 and air bags 94 on axle 96. Air bags 94 are supplied by air conduits 102 and air bags 90 are supplied by air conduits 92. Conduits 92 and 102 are attached to valve system 80 which is supplied pressurized air by inlet tube 100. Each axle is supported by two air bags. If one of the air bags develops a leak, valve system 80 is actuated such that the leaking air bag is no longer in fluid communication with the other air bags or inlet tube 100. The remaining air bag on the axle supports cargo bay 84 upon that axle. Although it is undesirable to support the cargo bay with only one air bag on an axle, this is sufficient to allow the tractor trailer to travel to the nearest service station where the damaged air bag may be repaired or replaced.

It is possible to place a shut off valve on the air bag itself to disengage an air bag from fluid communication with the other air bags and pressurized air supply. However, this is highly undesirable. When an air bag develops a leak, all of the air bags in fluid communication with it may deflate to a substantial degree before an operator has time to cut off fluid communication with the damaged air bag and the rest of the air bag system. This causes the cargo bay 84 to lower so that it is much closer to axles 86 and 96. Those skilled in the art will appreciate that when the air bags are deflated it is difficult to access objects underneath the cargo bay. By utilizing valve system 80 having all of the air flow regulators on the side or front of the cargo bay, manipulation of the air bag system and air flow through it is substantially easier. In this particular embodiment, valve system 80 is located on the side of cargo bay 84. However, those skilled in the art will appreciate that valve system 80 may also easily be placed on the forward end of the cargo bay or at another convenient location.

Whereas, the present invention has been described in relation to the drawings attached hereto, it should be understood that other and further modifications, apart from those shown or suggested herein, may be made within the spirit and scope of this invention.

What is claimed is:

1. A valve system for sealing off a leaking air bag within an air bag system of a tractor trailer, comprising:
    an inlet valve connected to a pressurized air supply;
    a metal block having a channel, the channel having at least two conduits fluidly connected to it;
    at least two manually actuated regulators hermetically attached to the at least two conduits, wherein the regulators comprise a valve, a handle and connection means, the connection means being attachable to conduits leading to at least two individually addressable suspension air bags that support a tractor trailer upon axles;
    at least one manually actuated dump valve attached to the channel having a valve, a handle and an attachment means;
    wherein the at least two individually addressable suspension air bags are fluidly connected to the at least two manually actuated regulators; and
    wherein the dump valve is capable of releasing pressure from the at least two individually addressable suspension air bags.

2. The valve system of claim 1 wherein the at least two manually actuated regulators comprise four manually actuated regulators, the at least two conduits comprise four conduits, and the at least two individually addressable suspension air bags comprise four individually addressable suspension air bags.

3. The valve system of claim 1 wherein the at least one manually actuated dump valve is connected to the channel by means of a conduit.

4. The valve system of claim 1 wherein the at least one manually actuated dump valve comprises two manually actuated dump valves.

5. The valve system of claim 1 further comprising a pressure gauge attached to the channel.

6. The valve system of claim 2 wherein two of the four individually addressable suspension air bags are engaged with a first axle and two of the four individually addressable suspension air bags are engaged with a second axle.

* * * * *